United States Patent [19]

Dronzek, Jr.

[11] Patent Number: 5,925,208
[45] Date of Patent: Jul. 20, 1999

[54] PROCESS FOR THE PRODUCTION OF PRINTED IN-MOLD LABELED MOLDED CONTAINERS

[75] Inventor: Peter J. Dronzek, Jr., Thornwood, N.Y.

[73] Assignee: NorthStar Print Group, Milwaukee, Wis.

[21] Appl. No.: 08/999,754

[22] Filed: Nov. 28, 1997

Related U.S. Application Data

[63] Continuation-in-part of application No. 08/909,663, Aug. 12, 1997, Pat. No. 5,711,839, which is a continuation of application No. 08/527,751, Sep. 13, 1995, abandoned.

[51] Int. Cl.⁶ .................................................. B32B 31/00
[52] U.S. Cl. .................... 156/257; 156/244.16; 156/268; 156/278; 156/257; 156/277; 427/380; 427/388.1; 264/132; 264/134; 264/211.12; 264/244.16
[58] Field of Search ...................................... 428/516, 220, 428/369, 347; 264/129, 132, 134, 563, 150, 176.1, 177.14, 209.1, 211.12, 244.16; 156/250, 257, 277, 263, 278, 268, 244.13, 237; 427/331, 380, 383.1, 388.1

[56] References Cited

U.S. PATENT DOCUMENTS 4,837,075   6/1989   Dudley .

FOREIGN PATENT DOCUMENTS 0 281 701      9/1988   United Kingdom .
WO 93/09925    5/1993   WIPO .

*Primary Examiner*—Merrick Dixon
*Attorney, Agent, or Firm*—Hedman, Gibson & Costigan, P.C.

[57] ABSTRACT

Polymeric sheets or rolls suitable for printing and forming at high rates of production of blown or injection in-mold labeled plastic containers are based on a polymeric transparent, translucent or contact clear substrate having a thickness in the range of 0.002 to 0.008 inches which is reverse printed and overcoated on the container-facing side with a heat activatable adhesive and coated or extruded on the opposite side with an antistatic and/or slip coating. Optionally, such sheet or roll can be printed and then cut into individual labels for affixing to the container as part of a in-molding process. Recyclable containers are provided at high speed without missing labels or doubled labels due to feeding problems. The labels are firmly adherent, and squeeze-release resistant and the indicia, because they are viewable through the labels themselves, are protected against spillage and abrasion.

25 Claims, No Drawings

PROCESS FOR THE PRODUCTION OF PRINTED IN-MOLD LABELED MOLDED CONTAINERS

CROSS REFERENCE TO RELATED APPLICATIONS

This application is a continuation-in-part of application Ser. No. 08/909,663, filed Aug. 12, 1997, now U.S. Pat. No. 5,711,839, which is, in turn, a continuation of application Ser. No. 08/527,751, filed Sep. 13, 1995, which is now abandoned.

FIELD OF THE INVENTION

This invention relates to the use of polymeric sheets or rolls particularly adapted for use printing processes for the in-mold labeling of injection- or blow-molded plastic containers. More particularly, the present invention relates to the use in printing processes of transparent, translucent or contact clear films having a heat activatable adhesive on one side and an anti-static and/or slip release coating on the other to make labels which are functional through the entire label converting and molding process.

BACKGROUND OF THE INVENTION

Plastic containers or bottles are prevalent today in a wide variety of shapes and sizes for holding many different kinds of materials such as light duty liquids (e.g., dishwashing detergent), heavy duty liquids (e.g., laundry detergents), motor oil, vegetable oil, herbicides, etc. Generally, these containers are fabricated from layers or a plurality of layers of plastic, particularly polypropylene, polyethylene and polyesters, particularly poly(ethylene terephthalate), by means of blow molding or injection molding.

Generally such containers are provided with a label which designates the trade name of the product and may contain other information as well. In some instances, the label is merely attached to the container after molding by means of adhesive or the like. However, the label may also be attached to the container during the container molding process. This technology by which the label is associated with the container during the molding operation is generally referred to as an in-mold label process.

Many devices are known for performing in-mold labeling of a plastic container. For example, German Published Patent Application No. 1,807,766 to Rosler et al in 1969 shows making plastic containers labeled by in-mold techniques with a transparent plastic film reverse-printed with indicia viewable through the film. There is no adhesive layer between the label and the hollow plastic container, however, and the bottle label relies on the attraction between the polymeric label film and the plastic container body for adhesion. This means of adhesion, particularly in squeezable containers, has been a continuing problem, because such labels will not remain adhered to the container but instead they will split or separate because the finished container is normally bent, flexed and squeezed during use.

In U.S. Pat. No. 4,837,075 issued to Dudley in 1989, there is shown a coextruded plastic film label for in-mold labeling comprising a heat activatable ethylene copolymer adhesive layer and a surface printable layer comprising polystyrene with optional intermediate layers to provide interlayer adhesion and recycle of reground labels. The label has preferably a thickness in the range of from about 0.002 to 0.005 inches (0.05 to 0.127 mm). Because the layers have different refractive indices and to hide blemishes, the patent (Col.3, lines 46–60) teaches the need to add pigment or fillers to provide a suitable background for printing. This has the effect of making the label opaque and it will no longer be suitable for example to reverse print the back side of the label and thereafter view the printed indicia therethrough.

In published European Patent Application No. 0,281,701 issued to Court et al in 1988, there is disclosed an in-mold label formed from a thin sheet of multicellular thermoplastic film composed of a biaxially extruded opaque, non-transparent polyethylene/polystyrene copolymer for use with a blow molded plastic container. The in-mold label is said to resist curling, wrinkling and crazing, to have thermodynamic properties similar to those in the plastic of the container, and may be recycled along with the container. Such multicellular films do not, however, have the same specific gravity as the plastic from which they are made because they are filled with gas-containing voids. Furthermore, because the films are not transparent, translucent or even contact clear they must be printed on the outside and then overcoated with a surface coating to insure that the printed indicia does not smear or rub off (Page 4, lines 46–47). Printing is suggested on the inner surface of the backing (Page 5, lines 16–18), but only if the label is to be used as a peel-off label apparently because in such event the indicia cannot be read through the opaque label material. Such labels have the further disadvantage that they cannot be applied to containers and then reground in high volume after use to make recycled materials for blow molding containers because the container colors will not match the same color printed on the label.

The present state of the art is further evidenced by Modern Plastics, September, 1990, in an article relating to plastics used for labels, pages 83–85. It is stated therein that labelstock producers are still going after in-mold labeling with a variety of products. Among the materials under active investigation was mentioned paperlike polyolefin films. However, work has shown that such films are only commonly manufactured in thicknesses of up to about 0.0017 mil and they therefore are not thick enough to provide the necessary strength to withstand the heat of the molding process, even if they are reverse printed to resist staining from spillage and even though such materials assist in recycling. They are also too thin to pick and place in the mold.

It has also been disclosed in published World Patent No. WO 93/09225, May 27, 1993, that transparent, translucent, clear or contact clear polymeric films having judiciously selected characteristics of thickness, specific gravity and coefficient of expansion and contraction and provided with a heat activatable adhesive coating have improved and surprising characteristics of adhesion to in-mold blown plastic containers with resistance to damage from cracking, tearing, creasing, wrinkling or shrinking due to physical abuse and flexing of the plastic container material. Furthermore, if such sheets or rolls are reverse printed on the back before being overcoated with the adhesive, and labels made therefrom are then affixed to bottles during the blow molding process, abrasion scuffing and product spillage will not adversely affect the function of the label.

Unfortunately, such labels have some important drawbacks, one of which is a lack of adaptability to common printing techniques, such as gravure printing, flexographic and/or rotary screen printing, as well as combination of flexographic, rotary screen, and gravure printing techniques. Merely by way of example, experiments have shown that the required sheeting step is not possible on the gravure press or on the off-line sheeter because the smooth surface of the film is so charged with static through the process that the sheets cling together by static charge and jam the delivery mechanism or stack poorly rendering them useless without significant manual labor. This results in tremendous waste and added cost which is prohibitive for market entry. It has now been found that application of a coating of antistatic and/or slip agent either by deposition or coextrusion during substrate manufacture opposite to the adhesive face permits the sheets to be converted without such difficulty. Furthermore, numerous experiments have shown that it is difficult to "jog" the sheets square (i.e., to register them) for guillotine cutting into smaller sheets. It is so difficult to do so that the sheets must be registered manually (i.e., one at a time) which tedious procedure is not efficient enough for entry into the commodity sensitive label market. It has now been discovered that a judiciously applied antistatic and/or slip coating or coextruded layer makes it easy to jog the smaller sheets so they can be die cut to register for proper graphics. The next step of the process is the die cutting step where the shape of the label is die cut out of the smaller stacks of sheets. Alternatively, the printed sheets or rolls can be cut into individual labels by rotary die cutting where the antistatic and/or slip layer is critical to collection and jogging for packaging after rotary cutting. In any event, the stacks of printed labels in practice are impossible to pick and individually place in the mold with high speed machinery without a substantial number of misses or picking doubles. It has now been discovered that this drawback can be overcome by applying an antistatic and/or slip coating on the original feed stock opposite the adhesive layer. Although a number of antistatic agents are known, many experiments were required to discover suitable ones for the present purposes. It appears that the final coating must provide either a high slip surface in order to reduce the ability to form a static charge by providing a low coefficient of friction on the non printed surface, or a conductive agent to conduct away any generated charge, or, preferably, a combination of both. Of course, the antistatic slip layer must be one which is compatible with the printing method used, as opposed to, e.g., a heat- or melt-activatible material which will activate under mold conditions. It should also be understood that conventional direct printed labels for in-mold use do not have the problems associated with reverse printed labels because the former use inks and varnishes which provide some slip and they do not generate the static charges that reverse-printed smooth base films, especially polyester and polyolefin films do.

Accordingly, a principal object of the present invention is to provide for the use of reverse-printable polymeric sheets or rolls to make labels for in-mold use without the problems discussed above. It is a further object of the invention to provide a method for in-mold labeling of hollow plastic containers using printed labels made from such sheets. It is still another object of the invention to provide articles labeled with printed labels which have the unexpectedly superior properties described above.

These and other objects of the invention will become apparent from the present specification.

SUMMARY OF THE INVENTION

According to this invention, there is provided a method of producing a printed in-mold labeled plastic container, the method comprising:

(a) providing a polymeric sheet or roll comprising:
  (1) a layer of a transparent, translucent or contact clear substrate formed from a polymer or a mixture of polymers, the layer being surface printable or capable of being rendered surface printable, having a thickness between 0.002 and 0.008 inches, having a specific gravity substantially the same as that of the polymer or mixture of polymers from which it is formed, and having a coefficient of thermal expansion or contraction under the conditions which the container sees the same or substantially the same as that of the plastic from which the container is made;
  (2) a print-receiving area on one of the two major faces of layer (1); and
  (3) a non-print-receiving area on the other one of the two major faces of layer (1), the polymeric sheet being regrind compatible with the plastic containers which are to be blow molded around labels made from it; and, (b) reverse printing indicia on said print-receiving area (2) of said substrate;

(c) coating a heat-activatable adhesive layer so as to cover whatever areas are to be permanently affixed to the container (excluding, however, areas where there may be a removable coupon), the adhesive being characterized by the ability to form a bond with the substrate and the plastic container such that the strength of the substrate-adhesive interface and the plastic container-adhesive interface and the cohesive strength of the adhesive itself are all greater than the forces required for deformation and recovery of the film itself; and (d) coating or using a coextruded anti-static and/or and slip composition on the non-print receiving area of the other one of the two major faces of layer (1); and forming labels from the sheet or roll either by (e) (ii) cutting the sheet or roll into smaller registered sheets, arranging them into a plurality of stacks of smaller sheets and jogging the stacks square to register the indicia and die cutting the stacks into a plurality of individual labels, each label bearing printed indicia or (e) (ii) rotary die cutting such labels and stacking them;

(f) picking one of the labels and positioning it in a mold;

(g) injection or blow molding a plastic container within the mold such that the label adheres to the outer surface of the blow molded container; and (h) removing the container from the mold.

Preferably the plastic label substrate comprises a single or multilayer of polypropylene, polyethylene, polyester or a mixture of any of such plastics. In other preferred features, the polymeric sheet or roll will be regrind compatible with the plastic containers which are to be molded around labels made from it. Also preferred are such sheets or rolls wherein the layer of substrate (1) comprises a clear or contact clear virgin, recycled or reprocessed polyester; a polymeric sheet or roll as defined above wherein the layer of substrate (1) comprises a clear or contact clear virgin, recycled or reprocessed olefin homopolymer or copolymer or a blend thereof. Reverse printing is critical on the substrate at the interface with the adhesive layer (3) and it is important that the adhesive layer overcoats the sheet completely or in a defined pattern whereby after affixing labels made from the sheet or roll to a plastic container during the molding process so that there will be captured a printed image equivalent to a front label between the label substrate and the container because this protects the label from the contents of the container when spilled, from the environment and from abrasion when the container is processed, shipped or used. Also contemplated is a polymeric sheet or roll as above defined wherein the printed indicia is provided with a primer for sealing the printed image and to enhance adhesive bonding if desired; a polymeric sheet or roll as first above defined wherein the heat activated adhesive layer (3) is a coated layer; a polymeric sheet or roll as defined above wherein the heat activated adhesive layer (3) comprises an ethylene/vinyl acetate copolymer or blends thereof with other components such as wax for slip and non-blocked characteristics. The invention also provides a polymeric sheet or roll as defined above wherein the print-receiving face of the substrate (1) has been treated to enhance ink anchorage by application of a primer, by flame treatment, by corona-treatment or by chemical treatment or is a coextruded print receiving layer with such characteristics. The preferred embodiments of the invention further comprise a method as first defined above wherein the antistatic coating composition comprises an amine, a quaternary ammonium compound, an anionic surfactant or a mixture of any of them, and particularly one in which the antistatic coating composition is deposited from an aqueous medium; a method as first above-defined in which said antistatic and/or slip layer is a coextruded layer; and a method as first above-defined in which said polymeric material comprises a lamination of a multiplicity of said substrates at least one of which is reverse printed and laminated to another which is clear or opaque.

DETAILED DESCRIPTION OF THE INVENTION

The terms "virgin", "recycled" or "reprocessed" when used herein and in the appended claims mean, respectively, new resin, reground resin, and resin sheets and the like which have been prepared for other uses, and after-treated to remove coatings, etc.

The term "regrind compatible" when used herein and in the appended claims means that containers with in-mold labels can be reground and molded after being mixed with virgin material. Regrind compatibility is determined by regrinding, mixing and molding.

The term "contact clear" when used herein and in the appended claims means a hazy material difficult to see through, but which, in intimate contact with a surface, transmits an underlying image. Polyethylene films are a common example. Contact clarity is determined by a simple trial and error test.

The terms "primer", "flame-treatment", "corona treatment", and "chemical treatment" when used herein and in the appended claims mean, respectively, a deposited coating for promoting adhesion generally comprising a filled or unfilled polymer, surface activation by carefully exposing to a bank of flames, without burning or distortion, exposure to high voltage direct current to microscopically etch the surface, and carefully etching the surface with chemicals known to be effective for this purpose.

The labels of the invention comprise a substrate which has characteristics substantially similar to the plastic container with which the label is to be used with special reference to the polymers used. This prevents loosening of the label, especially at its edges after the in-mold processing and facilitates recycling.

The substrate film can or cannot be oriented, depending on how it is made. As is well known, cast film can or cannot be oriented, but is usually oriented to a minor degree in the machine direction (MD). Blown film is usually oriented due to the manufacturing process, but is not usually sold as oriented because it is an unbalanced orientation. Extruded film is usually oriented to a major degree, and orientation can be monoaxial or biaxial. Although any such film can be used in the present invention, it is preferred to use monoaxially or biaxially oriented film as the substrate.

The substrate should have a "specific gravity substantially the same as that of the polymer or mixture of polymers from which it is formed." This gives the labels sufficient strength and facilitates their use in label transfer devices in automated molding equipment. The specific gravity is measured in standard ways, e.g., by American Society of Testing Materials (ASTM) Standard Test Method D782 and, if the values are reported in units of g/cm, variations of plus or minus 15 percent as between label and the source polymer are permissible as being within the meaning of "substantially the same." The substrate should have "a coefficient of thermal expansion or contraction under the conditions which the container sees the same or substantially the same as that of the plastic from which said container is made." Some variability is permissible, and the characteristic seems to be a factor in preventing lifting of the edges of the in-molded containers bearing the in-mold labels of the invention. Coefficient of thermal expansion or contraction is measured by standard methods, such as by ASTM Method D696, which expresses the values in units of $10^{-6}$ in/in/°C., or in values of %/°C. from which the permissible variations mentioned hereinabove are measured. However, the best test is a practical one: make a test container and subject it to a heat and cooling cycling in a controlled temperature oven. Those combinations of label materials and bottle plastics free of edge lifting are suitable.

A heat activated adhesive is applied from a printing roll, screen, and the like, in a single all-in-one process to a surface of the substrate which will come into contact with the container. Selected inkwork comprising printed indicia will be, as part of the same process, reverse printed on the back surface, i.e., under the adhesive coating by a printing process as described above or an art-recognized equivalent. Similarly, the non-coextruded antistatic and/or slip composition will be applied from the roll or screen in known ways before or after the adhesive and indicia are applied but also as part of the printing process. If a coextruded substrate is used the antistatic and/or slip layer is coextruded with the base polymer sheet during the extrusion process and is matched with the adhesive to provide the proper antistatic and slip for optional feeding into the mold. After die-cutting, as will be described later, each individual label will be picked up by high speed machinery of well-known types for positioning in an injection mold or a blow mold prior to container formation. As the container is formed, the adhesive is activated by the heat in the mold and its contents and adheres the label to an outer surface of the container.

The preferred embodiments of the labels of the present invention are fabricated from transparent, translucent or contact clear extruded, cast or blown films of polyolefin, e.g., polyethylene or polypropylene or polyester and these may optionally be provided with a print enhancing coating or coextruded layer such as those well known to those skilled in this art. The films are provided in rolls which may be printed with conventional label indicia on conventional printing equipment and furthermore can be die cut and applied to plastic containers using conventional in-mold equipment. Although for purposes of exemplary showing, the present invention is described and illustrated in connection with a polyethylene container, it will be understood that in-mold labeling may also be applied in the formation of propylene multi-layer bottles, polyethylene terephthalate bottles and other types of plastic containers formed by blow or injection molding. In certain cases, due to higher temperatures, dwell times and pressures used in injection molding, it is possible to use a product without adhesive if the inks and non-inked substrate areas are formulated to adhere to the container.

The preferred construction of the improved in-mold labels of the present invention uses a solid, i.e., non-multicellular thermoplastic film comprised of a monoaxially extruded polypropylene polymer. Such films are marketed under the name "PRINTRITE®" by Trico Industries, Davisville, R.I., 02854, U.S.A. Other preferred films are virgin and reprocessed poly(ethylene terephthalate) film, such as those marketed under the name "MYLAR®" and "REVVAL®", respectively, by DuPont, Wilmington, Del., U.S.A., or biaxially coextruded oriented polypropylene films, such as "LABELITE" by Mobil Chemical, Pittsford, Pittsford, N.Y. 14834, or "YM Matte" film from Toray Industries, North Kingston, R.I. 02852, U.S.A. In order to enhance the printing qualities of the thermoplastic film it may be provided with, for example, a print receptive coextruded layer known to those skilled in the art, filled, e.g., lightly filled with clay/calcium carbonate, silica and/or china clay, etc., or, preferably, an unfilled primer coating, such as an acrylic type resin. Typically such primers are available commercially from sources well known to those skilled in this art. For example, polyester primers are marketed by Morton International, Inc., Chicago, Ill., U.S.A., and acrylic or polyurethane primers by Zeneca Resins, Wilmington, Mass. 01887, U.S.A. The coating helps insure that the surface of the film will accept high quality printing and may also improve the abrasion and scuff resistant qualities of the finished label.

The physical properties of the aforementioned monoaxially oriented thermoplastic polypropylene film (PRINTRITE®), are set forth in Table 1:

TABLE 1

| Density | 0.905 g/cm$^3$ |
| --- | --- |
| Thickness | 0.0024–0.0038 inches |
| Folding Endurance | Excellent |
| Coefficient of Expansion** | 81–100 × 10$^{-6}$ in/in/° C. |
| % Shrink at 212° F., MD, TD | <2% |
| Surface treatment | Corona-discharge |

*—MD = machine direction; TD = transverse direction
**—Modern Plastics Encyclopedia, October 1989, page 606

The physical properties of the aforementioned reprocessed poly(ethylene terephahalate) ("REVVAL®") film are as set forth in Table 2:

TABLE 2

| Density | 1.388–1.395 g/cm$^3$ |
| --- | --- |
| Thickness | 0.007 inches |
| Tensile Strength | 15 kN/cm |
| Elongation at Break | 70% |
| Initial Tearing Resistance | 3.5 kN/cm thickness |
| Young's Modulus (@ 1%) | 370 kN/cm$^2$ |
| Folding Endurance | over 15,000 cycles |
| Coefficient of Expansion | About 0.002 %/° C. |
| % Shrink at 275° F., MD, TD* | <0.2% |
| Surface treatment | Saran resin coating |

*—MD = machine direction; TD = transverse direction

A heat activated adhesive is applied to such label sheets in a conventional manner. The use of such coatings for in-mold labels is reviewed in detail by D. H. Wiesman in Tappi Journal, Vol 69, No. 6, June 1986. A preferred adhesive comprises an organic polymeric resin such as an ethylene/vinyl acetate copolymer gel or dispersion. A suitable source of such adhesives is Morton International Corp. which sells such products under the name "ADCOTE®" 31DW1974 (Solvent-based) and "ADCOTE®57WW654 (Water-based). Also suitable is a warm melt adhesive designated Product No. S11723 and sold by Selective Coatings & Inks, Inc., Farmingdale, N.J., U.S.A. Before (if reverse printing is employed), applying the adhesive, the film is printed with suitable label indicia in a conventional manner. The adhesive is preferably applied from, for example, a gravure roll, or screen or flexographic plate, so as to produce a continuous coating. It has been found that the printing quality of the present thermoplastic film labels is equivalent to the printing quality of conventional paper labels. Finally, individual labels may be die cut from the sheets or rolls in the conventional manner e.g., by rotary die cutting, by square cutting, and the like.

With respect to printing, although various methods are used in this art to apply information or decorations to plastics, traditional equipment is used herein. To avoid unnecessarily detailed description, reference is made to Modern Plastics Encyclopedia, Mid-October Issue, 1989, "Printing" by Hans Deamer, pages 381–383.

Selection of the printing inks for use, and formation of print-enhancing surfaces and the production of images or indicia are well within the skill of workers in this field. Also, it is easily obvious to the artisan to produce the films of this invention with direct printed and reverse printed indicia on any print-receiving surface and to carry out the printing operation in the stages set forth in the description above. The inclusion of primers for sealing the printed image and to enhance ink and adhesive bonding is also conventional in this art.

The antistatic and/or slip agents used herein are applied as coatings or as coextruded layers, incorporated in the resin used for the labels. Such coatings are also applied by techniques known to those skilled in this art. For example, a thin coat of antistatic agent can be applied to one surface of the film which may already have been printed in reverse. Suitable such coatings can be selected from the many commercially-available materials known in this art, such as listed, for example in Modern Plastics Encyclopedia, Mid-October Issue, 1987, "Antistatic Agents" by J. L. Rogers, pages 130 and 132, as well as pages 579–581. Preferred for use herein are commercially-available antistatic coating compositions available, for example, from Akzo Chemie America, Chicago, Ill., under the trade name or designation Armostat® Aqueous Ethoquad CY12, from Union Carbide Corp., Danbury, Conn., under the trade name or designation Silwet® L-77, a modified silicone, or from Manders Premier, Milwaukee, Wis., U.S.A. under the tradename "FLEXCON" a propietary mixture which is gravure, flexographic and screen applicable or from Process Resources Corp., Thornwood, N.Y., U.S.A. under the tradename or designation PD 945, a mixture which is gravure, flexographic or screen applicable and having the typical properties described in Table 3:

TABLE 3

| Solids | 4% |
| --- | --- |
| pH | 8.5–9.5 |
| Viscosity | 10–50 CPS 2/20 RPM @ 77° F. |
| Weight/gallon | 8.5 LBS/GAL |
| Color | Off White |
| Diluent | Water |
| Clean-Up | Water |
| Shelf-Life | 90 Days |

The antistatic coating can be applied as part of the printing process and it may be applied either before or after application of the adhesive layer.

With respect to the coextruded slip layers, migratory slip aids such as fatty acid amides (soaps) can be used in extruded or coextruded layers, such as but not limited to erucamide, oleoamide or steramide. Other types of migratory slip additives are silicone oils. Examples of non-migratory slip aids are talc platelets, silicone spheres or waxes. In any event, migratory, non-migratory, and combinations thereof, can be used as slip agents.

The in-mold labels of the present invention may be utilized on conventional in-mold labeling apparatus in the same manner as conventional paper labels. See, for example, the article in Tappi Journal, cited above.

To save unnecessarily detailed description, devices for performing in-mold labeling on a container, which are well known, are the subject matters of U.S. Pat. Nos. 3,759,643 to Langecker, 1973, and 4,479,644 to Bartlmee et al, 1984. In general, all such apparatus use a injection mold or a blow mold having a cavity for containing a hollow body, and a member which is movable toward the cavity. The member includes a section for carrying a label to be placed in the mold during movement of the member toward the cavity. Ventilation openings are provided in the mold for venting any air between the mold and label. Variations in the apparatus that may be employed include using rotating mold units and oscillating means for picking up individual labels and depositing them in the rotating molds at appropriate intervals to automate the process.

The patents, applications, publications and test methods mentioned above are incorporated herein by reference.

Many variations of the present invention will suggest themselves to those skilled in the art in light of the above detailed description. For example, instead of virgin oriented polypropylene as the face film, virgin poly(ethylene terephthalate), polyamide, polyethylene, polycarbonate, fluoropolymers and polyimide films can be used. Instead of 0.007 inch polyester film, 0.004 inch polyester film can be used. Instead of ethylene/vinyl acetate as the heat activated adhesive layer, low density polyethylene can be used. Instead of an acrylic printing enhancing coating, another coating, such as a polyester or urethane resin, can be printed in selected areas on the print receiving face of the polymeric sheet or roll. Instead of a polyethylene container, a polypropylene container or a polyester container, the labels can be applied to containers made by injection molding or by blow molding single or multi-layers of barex, cellulose acetate, cellulose acetate butyrate, cellulose acetate propionate, ionomer resin, K-resin, polystyrene and poly(vinyl chloride). Polypropylene labels can be put on polyethylene containers and polyethylene labels can be put on polypropylene containers.

As antistatic agents of the nonionic type there can be used ethoxylated, propoxylated or glycerol compounds. Alkyl amines can be used as antistats of the amine type. Alkyl ammonium quaternary salts can be used as antistats of the quaternary type. The antistats can be applied in the gravure, flexographic or screen printing process as an aqueous and/or alcoholic solution at 1 or 2% concentration, by weight.

Instead of a single layer label, the labels can comprise two, or more, layers. For example, the outer layer can comprise a reverse printed transparent substrate, comprising at least one layer, through which the indicia is viewed, and this can be laminated to at least one second film (transparent or opaque), and which is unprinted, but which bears the heat activatable adhesive layer, the second film having all of the thermodynamic characteristics required for the first, and serving to anchor the composite label to the blow molded container.

All such obvious modifications are within the full intended scope of the appended claims.

I claim:

1. A method of producing a printed in-mold labeled plastic container, said method comprising:

(a) providing a polymeric material selected from the group consisting of a polymeric sheet and a polymeric roll, said polymeric material comprising:

(1) a layer of a substrate selected from the group consisting of a transparent polymer, a translucent polymer, a contact clear substrate formed from a polymer and a mixture of any of said polymers, said layer also being selected from the group consisting of substrates which are surface printable and substrates which are capable of being rendered surface printable, and having a thickness between 0.002 and 0.008 inches, said layer having a specific gravity substantially the same as that of the substrate from which it is formed, and having a coefficient of thermal expansion under the conditions which the container sees which is substantially the same as that of the plastic from which said container is made;

(2) a print-receiving area on one of the two major faces of layer (1); and (3) a non-print-receiving area on the other one of the two major faces of layer (1), said polymeric material being regrind compatible with the plastic containers which are to be molded around labels made from it;

(b) reverse printing indicia on said print-receiving area (2) of said substrate;

(c) coating a heat activatable adhesive layer so as to cover whatever areas are to be permanently affixed to the container, said adhesive being adapted to form a bond with said substrate and said plastic container such that the strength of the substrate-adhesive interface and the plastic container-adhesive interface and the cohesive strength of the adhesive itself are all greater than the forces required for deformation and recovery of the film itself;

(d) providing the non-print receiving area of the other one of the two major faces of layer (1) with properties selected from the group consisting of antistatic surface properties, slip surface properties and antistatic and slip surface properties;

(e) cutting said sheet or roll into smaller registered sheets, and arranging them into a plurality of individual labels, each label bearing printed indicia;

(f) picking one of said labels and positioning it in a mold;

(g) molding a plastic container within said mold such that said label adheres to the outer surface of the molded container; and (h) removing said container from the mold.

2. A method as defined in claim 1 wherein said polymeric material is selected from the group consisting of a single layer of polypropylene, polyethylene, polyester, a multilayer of polypropylene, polyethylene, polyester, and mixtures of any of polypropylene, polyethylene, polyester.

3. A method as defined in claim 1 wherein said polymeric material is selected from the group consisting of a single layer of plastic selected from the group consisting of clear polyester, contact clear oriented virgin polyester, recycled polyester and reprocessed polyester and a multiple coextruded layer selected from the group consisting of plastic selected from the group consisting of clear polyester, contact clear oriented virgin polyester, recycled polyester and reprocessed polyester.

4. A method as defined in claim 1 wherein said polymeric material is selected from the group consisting of a single layer selected from the group consisting of clear virgin olefin homopolymer, clear recycled olefin homopolymer, clear reprocessed olefin homopolymer, contact clear virgin olefin copolymer, contact clear recycled olefin copolymer, contact clear reprocessed olefin copolymer and a blend thereof and a multiple coextruded layer selected from the group consisting of clear virgin olefin homopolymer, clear recycled olefin homopolvmer, clear reprocessed olefin homopolymer, contact clear virgin olefin copolymer, contact clear recycled olefin copolymer, contact clear reprocessed olefin copolymer and a blend thereof.

5. A method as defined in claim 1 wherein said indicia are reverse printed on said substrate at the interface with said heat-activatable adhesive layer and said adhesive layer overcoats the sheet whereby after affixing said label to said plastic container during the molding process there will be captured a printed image equivalent to a front label between the label substrate and the container thus protecting said label from the contents of said container when spilled, from the environment and from abrasion when the container is processed, shipped and used.

6. A method as defined in claim 1 wherein said printed indicia is provided with a primer for sealing the printed image and to enhance adhesive bonding.

7. A method as defined in claim 1 wherein said heat activatable adhesive layer comprises an ethylene/vinyl acetate copolymer.

8. A method as defined in claim 1 wherein the print-receiving face of said substrate (1) has been treated to enhance the anchorage of ink.

9. A method as defined in claim 1 wherein said antistatic coating composition is selected from the group consisting of an amine, a quaternary ammonium compound, an anionic surfactant and a mixture of any of them.

10. A method as defined in claim 9, wherein said antistatic coating composition is deposited from an aqueous medium.

11. A method as defined in claim 1, wherein said layer of step (d) is a coextruded layer.

12. A method as defined in claim 1, wherein said polymeric material comprises a lamination of a multiplicity of said substrates at least one of which is reverse printed and laminated to another which is clear.

13. A method as defined in claim 1, wherein said surface in step (d) is provided by coating with a composition.

14. A method as defined in claim 1, wherein step (e) comprises cutting said sheet or roll into smaller registered sheets, arranging them into a plurality of stacks of smaller sheets and jogging the stacks square to register the indicia and die cutting said stacks.

15. A method as defined in claim 1, wherein step (e) comprises rotary die cutting said sheet or roll.

16. A method as defined in claim 5, wherein said adhesive layer overcoats said interface completely.

17. A method as defined in claim 5, wherein said adhesive layer overcoats said interface in a defined pattern.

18. A method as defined in claim 8, wherein said treatment comprises using a primer.

19. A method as defined in claim 8, wherein said treatment comprises flame treatment.

20. A method as defined in claim 8, wherein said treatment comprises corona-treatment.

21. A method as defined in claim 8, wherein said treatment comprises chemical treatment.

22. A method as defined in claim 8, wherein said treatment comprises using a coextruded print receiving layer.

23. A method as defined in claim 1, wherein step (g) comprises infection molding.

24. A method as defined in claim 1, wherein step (g) comprises blow molding.

25. A method as defined in claim 1, wherein said polymeric material comprises a lamination of a multiplicity of said substrates at least one of which is reverse printed and laminated to another which is opaque.

* * * * *